June 9, 1942.   H. W. JONES   2,285,518
METHOD OF AND APPARATUS FOR CONDITIONING METAL BODIES
Filed May 11, 1940   2 Sheets-Sheet 2

INVENTOR
HOMER W. JONES
BY
ATTORNEY

Patented June 9, 1942

2,285,518

UNITED STATES PATENT OFFICE 2,285,518

METHOD OF AND APPARATUS FOR CONDITIONING METAL BODIES

Homer W. Jones, Westfield, N. J., assignor to The Linde Air Products Company, a corporation of Ohio Application May 11, 1940, Serial No. 334,494

18 Claims. (Cl. 266—23)

This invention relates to a method of and apparatus for thermally conditioning the surfaces of ferrous metal bodies and more particularly to a method of and blowpipe apparatus for thermochemically removing a layer of metal from the surface of a steel body such as a billet, bloom, slab or the like and to a method of and apparatus for removing scale from such a body.

In the casting of steel ingots and during the hot rolling of steel, defects such as scale, cracks, seams, slag inclusions and the like form on and in the surface of the steel body and such formations in turn, cause imperfections in the finished, rolled product. In order to reduce the number of rejections of finished rolled products, such surface defects are generally removed before or during an intermediate stage of the rolling operation. Scale is commonly removed by pickling and other defects have often been removed by mechanically cutting or chipping away such defective surface metal. Hand-operated blowpipes commonly referred to as hand-deseaming blowpipes, are now often used for thermochemically removing the defective surface metal adjacent each defect by effecting the combustion of the steel with oxygen but such hand-deseaming is not entirely satisfactory because it is relatively slow and because the steel bodies must be relatively cold. More recently, machines employing suitable blowpipe means have come into use for thermochemically conditioning a surface of billets, and the like. These machines may be used for conditioning steel bodies when cold but preferably are used while the steel bodies are at a rolling temperature and are passing from one roll stand to another of a roll table such as commonly employed in a steel mill.

These surface-conditioning or desurfacing machines thermochemically remove metal from the surface of a steel body when the relative movement between the steel body and the desurfacing machine is in one direction only. When desurfacing with such machines, it is customary to move the steel body along the roll table past the desurfacing machine to remove metal from one surface or from two opposite surfaces. In order to condition other surfaces after the steel body has passed once through the desurfacing machine, it must be turned about its longitudinal axis by suitable means, the roll table must then be reversed to move the steel body back past the desurfacing machine with the machine in an inoperative position, and the roll table must then be reversed the second time to move the steel body through the desurfacing machine for conditioning the other surface or, as the case may be, the other two opposite surfaces. Thus, the direction of the roll table is reversed at least twice and the billet is moved past the desurfacing means at least three times. Instead of the foregoing procedure, the steel body may be moved along the roll table past a desurfacing machine; the steel body may be turned about its longitudinal axis; and the steel body may then be moved past a second desurfacing machine. This last-mentioned procedure requires two relatively expensive desurfacing machines and a manipulating device and increases the cost of the procedure. It also requires a greater length of conveyor line which may not be available if the apparatus is to be installed in existing steel mills.

The present invention provides a process and apparatus for thermally conditioning or thermochemically desurfacing the surface of a steel body such as a bloom or slab and the like and for eliminating scale from such surfaces, and more particularly for thermochemically removing a layer of surface metal from a longitudinal surface of the body, preferably while the steel body is at a rolling temperature and is moving along a roll table from one rolling operation to another. A multiple-nozzle blowpipe head producing high temperature preheating flames and a composite sheet-like oxygen stream substantially equal in width to the surface, is moved relatively along the slab and is maintained in contact with the work surface during such movement, in order that a uniform layer of metal may be removed and the gas efficiently used. The blowpipe head supporting mechanism is so arranged and constructed that the head is maintained in sliding contact with the surface at a substantially uniform pressure irrespective of changes in the level of the surface, and the head may be moved through an arc from a first operating position adjacent a surface of the work to a second operating position adjacent the same or another surface of the work to remove metal from such surface when the relative movement is in the opposite direction. Such a method and apparatus greatly simplifies the procedure for desurfacing billets, slabs, and the like; reduces the number of operations necessary to condition such steel bodies; reduces the time required for conditioning such steel bodies; and reduces the amount of apparatus required for desurfacing such steel bodies and the space occupied by the apparatus.

Accordingly, the principal objects of this invention are: to provide an improved process of conditioning or desurfacing bodies of ferrous metal, preferably while such bodies are at an elevated temperature; to provide novel apparatus for carrying out the process; to provide a process and apparatus for conditioning metal bodies when the relative movement of the steel bodies is in either of two opposite directions; to provide such a process and apparatus for desurfacing at least one longitudinal surface of metal bodies when such bodies are moving in one direction and for desurfacing at least one other longitudinal surface when such bodies are moved in an opposite direction; to provide such a method and apparatus for successively desurfacing adjacent or opposite surfaces of such bodies when such bodies are successively moved in opposite directions; to provide such apparatus including means for moving the desurfacing head through an arc; and to provide apparatus for conditioning both top and bottom surfaces of a slab, to avoid the use of means for overturning the slab, which apparatus will occupy a relatively short section of a conveyor when installed in an existing steel mill.

These and other objects and novel features of this invention will become apparent from the following description and the accompanying drawings, in which.

Figure 1:
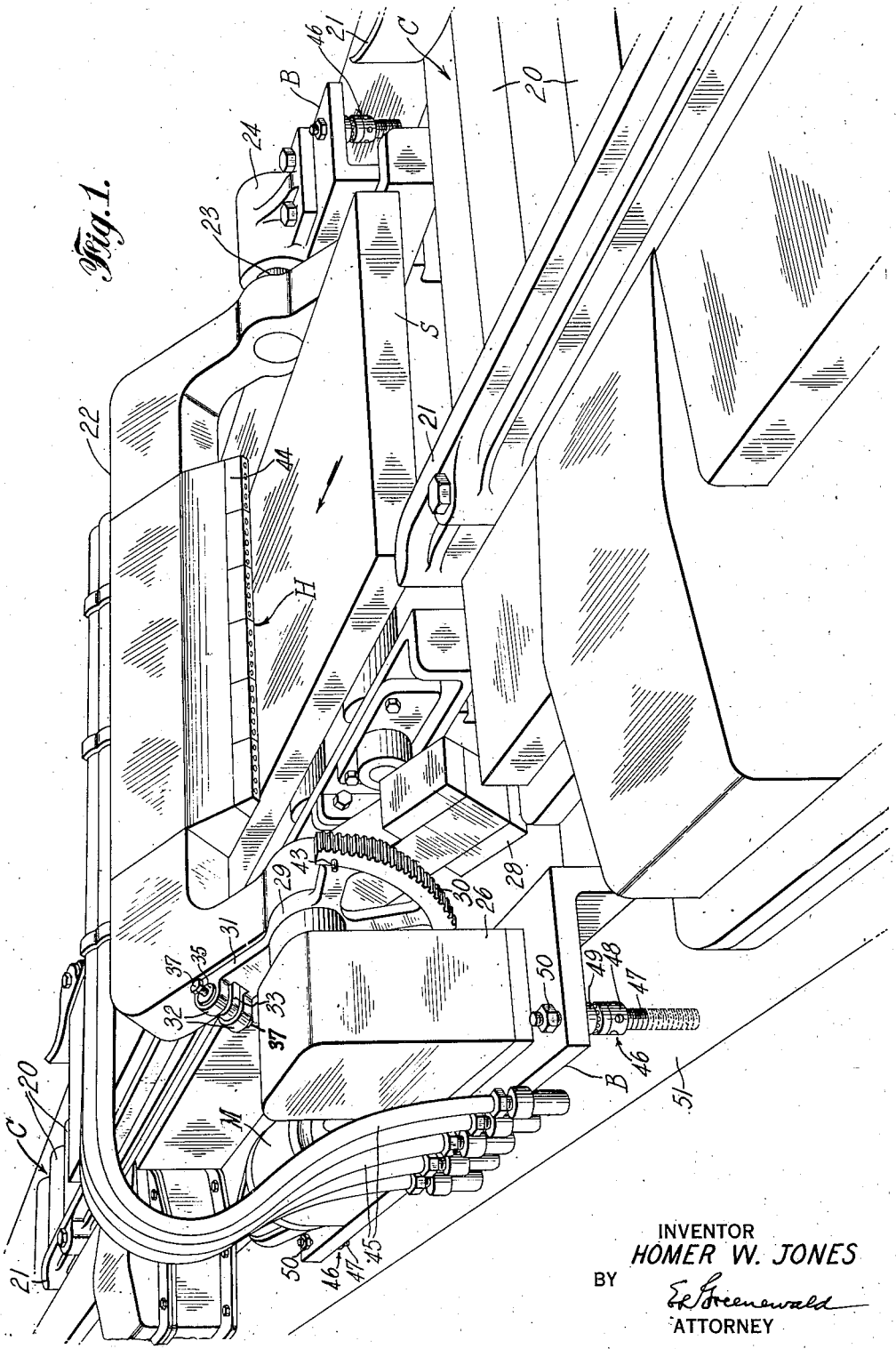
Fig. 1 is a perspective view of an exemplary slab desurfacing machine embodying the principles of the present invention and installed in a roll table such as is employed in a steel mill.
Figure 2:
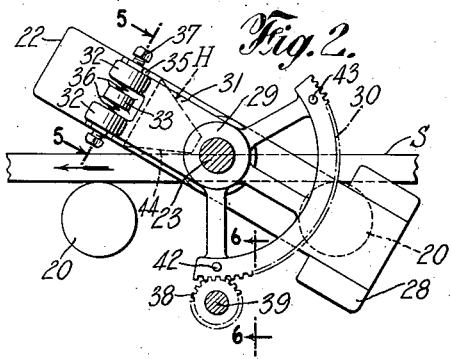
Fig. 2 is a schematic side elevational view, partially in section, of the machine of Fig. 1.
Figure 3:
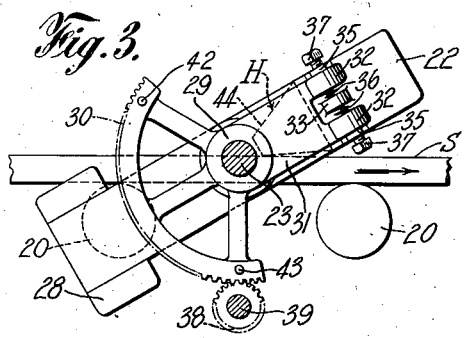
Fig. 3 is a view similar to Fig. 2, showing the desurfacing machine in position for conditioning the top surface of a metal body moving in the opposite direction.
Figure 8:
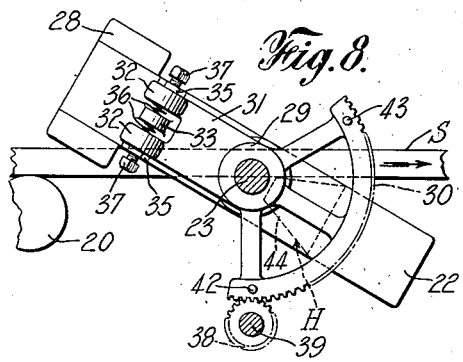
Figure 7:
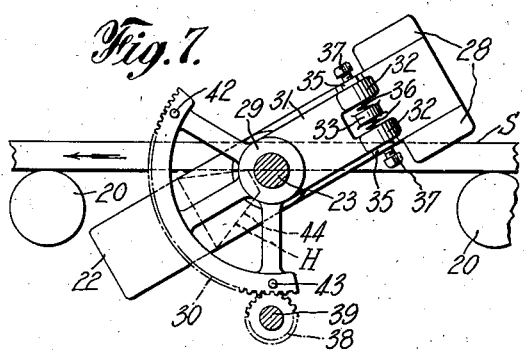
Figure 9:
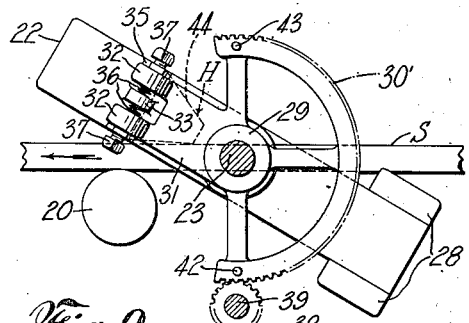
Figure 10:
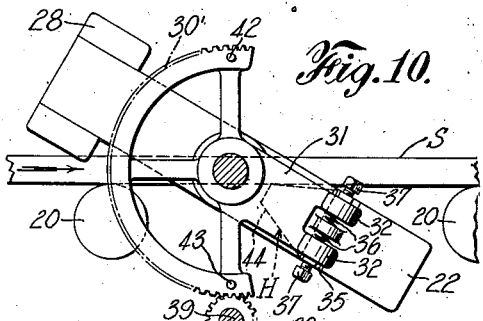

Figs. 7 and 8 are schematic side elevational views, similar to Figs. 2 and 3, respectively, of the desurfacing machine of Fig. 1, adapted for conditioning the bottom surface of a metal body; and, Figs. 9 and 10 are schematic side elevational views, similar to Figs. 2 and 3, respectively, of a desurfacing machine similar to that of Fig. 1, but adapted for conditioning both top and bottom surfaces of a metal body.

Fig. 1 discloses one form of apparatus embodying the principles of the present invention that may be installed in a portion of the usual roll table conveyor, such as is used in steel mills for moving billets, blooms, or slabs, the apparatus being adapted for thermochemically removing a relatively shallow layer of metal from the surface of semi-finished steel bodies, preferably while such bodies are in transit from one rolling operation to another and are at a relatively high rolling temperature. The ferrous metal body, such as a semi-finished steel slab S, is supported on the usual rollers 20 of a steel mill conveyor table C. The rollers 20 are mounted on axles supported in suitable bearings and the axles are connected through suitable bevel gearing and a drive shaft to the roll table drive motor in the usual manner. Such gearing and motor are not shown in the interest of greater clearness in the drawing. The slab S may be accurately, transversely positioned on the rollers 20 for the desurfacing operation by means of the transversely adjustable guides 21. The multiple nozzle blowpipe head shown generally at H is attached to and supported by a U-shaped member 22 mounted on two short shafts or trunnions 23 pivotally supported in bearings 24 located on opposite sides of the roll table. One of the bearings 24 is mounted directly on one end portion of a base plate B and the other bearing is mounted within a box-like member 26 mounted on the other end portion of the plate B or transverse supporting frame below the roll table C. A counter-balancing weight 28 is attached to each of the outer ends of the U-shaped member 22 for substantially counter-balancing member 22 and head H. The weight 28 may be equal to or slightly heavier or lighter than the weight necessary to exactly balance the member 22 and the attached apparatus and may be mounted so as to be adjustable along the arms of member 22 to vary the leverage and the counter-balancing effect of the weights.

Figures 5, 6:
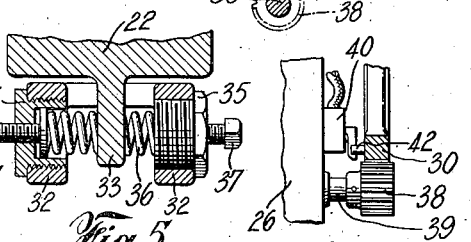
Fig. 5 is a fragmentary sectional view on an enlarged scale taken along line 5—5 of Fig. 2.
Fig. 6 is a fragmentary sectional view on an enlarged scale showing the limit switch and taken along line 6—6 of Fig. 2.

Loosely mounted on one of the short trunnions 23 is a member 29 formed with a gear-toothed portion or gear segment 30 and with an arm portion 31 having forked outer ends 32. As shown more clearly in Fig. 5, a pin or block 33, secured to or forming a part of member 22, extends into or between the forked ends 32 of arm 31. The block 33 is smaller than the slot between the forked ends 32 and in each of the ends 32 there is threadedly secured a cup 35 containing a compressed spring 36. The springs 36 press against opposite sides of block 33 to urge it to the central position. In the rear of each cup 35 there is an adjustable bolt 37 which may be turned to adjust the pressure exerted by springs 36. The weights 28 substantially counter-balance member 22 and head H and the springs 36 normally maintain the block 33 substantially centrally in the slot. When in the operating position, one set of springs 36 is partially compressed to maintain the head H in sliding contact with the slab S. The member 22 and head H thus are free for a limited amount of arcuate float as the block moves within the slot to allow for irregularities in the surface of the slab.

Referring more particularly to Figs. 1, 2, 3, and 6, the gear segment 30 meshes with a pinion 38 mounted on a horizontal shaft 39 projecting from the box 26, and is connected through suitable speed-reducing gearing in the box 26 to a reversible motor M, mounted on base plate B. The motor preferably has a usual form of electrically operable brake (not shown). Thus, when the motor M is energized the brake is released and the pinion 38 is rotated to move member 22 and head H through an arc about the axis of the short shafts or trunnions 23. The axis of the trunnions 23 is adjacent and parallel to the upper surface of the slab S and is preferably closer to the slab S than the head H so that the head H can be moved through the arc from one position to the other when the slab S is in an operative position beneath the head. Means are preferably provided for automatically stopping the motor M when the head H is in either of its correct operative positions and such means may comprise a limit switch 40 interposed in the electrical circuit of the motor and mounted on the side of the box 26 in a position to be engaged by either of the two fingers 42 or 43 which are preferably adjustably mounted on and project from the side of the gear segment 30. When the motor is energized to rotate in either direction, the head H is moved through an arc, and when the head H reaches an operative position adjacent the surface of the slab, one of the fingers 42 or 43 contacts the switch 40 to break the motor circuit, stop the motor and release the brake to maintain the head in the desurfacing position. The switch 40 is so constructed and connected in the electrical motor circuit that when operated to stop the motor M, the motor can only be energized to cause it to operate in the reverse direction.

The head H may comprise a plurality of multiple nozzle units including blowpipe means for supplying a combustible gas mixture to the preheat passages of each nozzle for producing preheating flames. Each blowpipe unit also includes means for supplying each nozzle with an oxidizing gas, such as oxygen; includes water circulating passages for cooling the unit header; and a nozzle shoe 44 for slidingly contacting the surface of the slab.

The supply pipes 45 are for supplying cutting oxygen, preheating oxygen, preheating acetylene, and cooling water through suitable control valves to the head H and for conveying the cooling water from the head to a drain. Electrically operable or manually operable valves may be placed in the supply lines for controlling the flow of gases and liquid to all of the headers. Thus the head H is adapted for projecting preheat flames and/or a composite sheet-like stream of oxidizing gas, such as oxygen, onto the slab for thermochemically removing a layer of metal from the surface of the slab.

The desurfacing apparatus is mounted on and is supported by the base plate B. It is preferably that plate B be mounted so as to be vertically adjustable for raising and lowering the desurfacing apparatus to vertically adjust the level of the longitudinal axis of trunnions 23 according to the thickness of the slab S. Each corner of the plate B is supported by a vertically adjustable jack 46. The relatively large threaded post 47 is threadedly supported by a suitable supporting means such as a foundation sill 51 and has a reduced upper portion extending through a hole in the plate B. On each post 47 there is a head 48 and a ball thrust bearing collar 49 disposed between head 48 and the bottom of plate B. Each head 48 is drilled to receive the end of a bar for manually turning the nut to raise or lower the collar 49 and the base plate B. The upper end of each post 47 may be provided with a nut 50 to prevent the plate B from being lifted off the jacks 46. By means of jacks 46, the height of plate B and the level of the surface-conditioning apparatus may be readily adjusted and, these parts may be aligned with the roll table so that head H is parallel to and will slidingly contact the top or bottom surface of the slab S. Power-actuated means such as motor-driven jacks could be used for adjustably supporting the desurfacing apparatus instead of the manually operable jacks which are shown.

Figure 4:
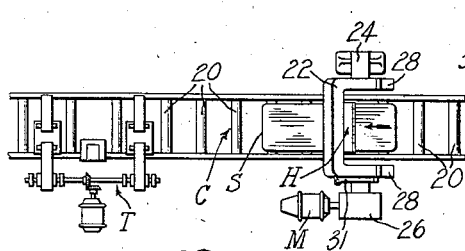
Fig. 4 is a schematic plan view of a desurfacing machine, such as shown in Fig. 1, installed in a roll table and of manipulator apparatus installed in the roll table for turning the metal body about a longitudinal axis thereof.

Referring more particularly to Figs. 2, 3, and 4, in operation, the roll table motor is energized to move the slab S along the roll table C until the starting edge is in position adjacent the head H. If the slab S is not at the ignition temperature, the preheating flames are turned on and after a short pause for preheating to heat a portion of the metal to be removed to the ignition temperature, the cutting oxygen is turned on and the roll table motor is energized to move the slab S toward the left, as indicated in Figs. 2 and 4, to thermochemically remove a layer of metal from the upper surface. After desurfacing the upper longitudinal surface, the gases are preferably turned off during the time the blowpipe head is moved from one operative position to another operative position, and the relative positions of the head H and slab S are shifted so as to desurface a second surface of the slab. The slab is moved along the roll table C to a manipulator shown generally at T for turning slab S about a longitudinal axis, to present or expose a different surface in the upper position. Either after or during the period the slab is being turned, the motor M is energized to move the head H and member 22 through an arc about the axis of trunnions 23 to position the head H as shown in Fig. 3 for conditioning the newly exposed upper surface of the slab S when moved toward the right along the roll table C. When the head H is in either of the positions indicated in Figs. 2 and 3, the head is so positioned as to apply the gas stream at an acute angle against and along the upper longitudinal surface of slab S, substantially in the direction from which successive portions of surface metal are to be removed. If, for any reason it is desirable to remove a greater depth of metal from the upper surface than is removed in one pass, the slab S may be moved back through the desurfacing machine without being inverted. Often it is only necessary to condition the relatively wide top and bottom longitudinal surfaces of wide slabs, but if, for any reason, it is desirable to condition all four longitudinal surfaces of a metal body, the metal body may be turned about its longitudinal axis by a second manipulator located at the right of the desurfacing machine and the foregoing process repeated to condition all four surfaces.

Referring more particularly to Figs. 7 and 8, the desurfacing machine of Fig. 1 is schematically shown adapted for conditioning the bottom longitudinal surface. When conditioning the bottom surface, it is preferable that the counterbalancing weights 28 be slightly heavier than member 22 and head H, so that head H is urged upwardly into sliding contact with the bottom surface although the upper springs 36 may be initially compressed slightly by the segment 30 to accomplish this function. Member 22 and head H are positioned as shown in Fig. 7 for conditioning the bottom surface of slab S when the slab is moving toward the left. After the bottom surface has been conditioned, the relative positions of the head and slab are shifted so as to desurface a different surface. The slab is turned about a horizontal axis by a manipulator T to present a different bottom surface, the member 22 is moved through an arc about the axis of trunnions 23 to the position shown in Fig. 8, and the slab is moved toward the right to condition the newly-exposed bottom surface. If desirable, the slab may be then turned about its longitudinal axis and the process repeated for conditioning all four surfaces.

Referring more particularly to Figs. 9 and 10, the previously described gear segment 30 is here shown as being modified and extended to form the gear-toothed portion 30' which is of great enough magnitude to move the member 22 and head H through an arc of substantially 180 degrees. In Fig. 9, the machine is shown positioned similarly to the position shown in Fig. 2 for conditioning the upper surface of slab S which is being moved toward the left. After slab S has been moved past the desurfacing machine to condition the upper surface, the slab S is not turned about its longitudinal axis, but the relative positions of the head and the slab are shifted for conditioning a different surface, that is, the head H is moved through an arc of substantially 180 degrees to position the head for conditioning the bottom surface of the slab similar to the position of Fig. 8. The slab S is then moved along the roll table C toward the right to condition the bottom surface of the slab S. If a square body such as a billet is being conditioned, the body may be turned 90 degrees about its longitudinal axis after the top and bottom surfaces have been conditioned, and the foregoing process repeated to condition the other two longitudinal surfaces when it is desirable to condition all four surfaces of such body.

When member 22 and head H are moved through an arc of 180 degrees to condition both the top and bottom surfaces, it is preferable that the axis of trunnions 23 and of the arc through which the head is moved, should be midway between the upper and lower surfaces of slab S so that the work contacting shoes 44 may be symmetrically positioned on each of the respective surfaces. If the axis of the arc through which the head H is moved is not positioned midway of the top and bottom surfaces, the shoes 44 do not support the head H in the same relative positions and the head H will not be moved through exactly 180 degrees, but will be moved through an arc of substantially 180 degrees. In Figs. 2 and 3, 7 and 8, and 9 and 10, the axis of the arc, through which head H is moved, is the longitudinal axis of the trunnions 23, and the axis of the arc is parallel to the transverse, horizontal axis of the slab and is parallel to the surfaces being conditioned.

Having described my invention in detail, it is obvious that various modifications can be made therein without departing from the spirit and scope of the invention. The head H could be adapted for directing only heating flames against the slab for thermally removing scale therefrom and could readily be adapted for conditioning elongated bodies of different shapes such as ingots, billets, and substantially square bodies. Additionally, member 22 and head H could be mounted on vertical trunnions for desurfacing vertical surfaces instead of horizontal surfaces, and the head H could be mounted in a different manner for movement through an arc.

What is claimed is:

1. A method for surface conditioning a ferrous metal body which comprises directing a gaseous stream from a nozzle at an acute angle against a surface of such a body and substantially in the direction toward successive portions to be conditioned; providing relative movement between said nozzle and said surface in a forward direction to advance the conditioning operation along said surface in the general direction of flow of said stream; shifting said nozzle through an arc about an axis parallel and adjacent to said surface to direct such stream at an acute angle of similar value but opposite position to said first-mentioned angle against a surface of said body; and providing relative movement between said nozzle and said body in a reverse direction along said last-mentioned surface to condition said last-mentioned surface.

2. A method of thermochemically desurfacing a body of ferrous metal which comprises heating to its ignition temperature a region of said surface extending transversely of the direction in which the desurfacing operation is to advance; applying a substantially sheet-like stream of oxygen against said region at an acute angle to said surface; providing relative movement between said oxygen stream and said surface of said body to remove a relatively shallow layer of metal therefrom; shifting the relative positions of said oxygen stream and said body so as to apply said stream at an acute angle to a second region extending across a second surface of said body; providing relative feeding movement between said oxygen stream and said second surface to remove a relatively shallow layer of metal therefrom, said last-mentioned feeding movement being in a direction opposite to said first-mentioned feeding movement.

3. The method of thermochemically desurfacing a body of ferrous metal which comprises heating to its ignition temperature a region extending across at least a substantial portion of a longitudinal surface of said body transverse to the direction in which the desurfacing operation is to advance by the application of a plurality of heating flames distributed across such region; applying a substantially sheet-like stream of oxygen against said region at an acute angle to said surface; relatively moving at least said oxygen stream along said surface of said body to remove a relatively shallow layer of metal therefrom; repositioning said oxygen stream by movement through an arc of substantially 180 degrees; relatively moving said oxygen stream along a longitudinal surface which is opposite to said first-mentioned longitudinal surface to remove a relatively shallow layer of metal therefrom, said last-mentioned relative movement being in a direction opposite to said first-mentioned relative movement.

4. A desurfacing process in which metal at the ignition temperature is thermochemically removed from the surface of a ferrous metal body, which comprises applying a substantially sheet-like stream of oxygen from a head against a relatively narrow zone extending substantially across an exposed longitudinal surface of the body, such oxygen stream being applied at an acute angle against such surface and in a direction from which successive portions of surface metal are to be removed; relatively moving such an oxygen stream and said surface of said body to remove a relatively shallow layer of metal therefrom; turning said body to position another longitudinal surface for treatment by said oxygen stream; moving said head through an arc about an axis parallel to said other surface to direct said oxygen stream at an acute angle against said other surface; and relatively moving said oxygen stream and said other surface in a direction opposite to the direction of said first-mentioned relative movement to remove a relatively shallow layer of metal from said other surface.

5. A method for conditioning the surface of an elongated ferrous metal body, which comprises applying a gas stream from a nozzle at an acute angle against and along an upper surface of said body; relatively moving said gas stream along said surface in a forward direction to condition said upper surface; turning said body through an arc of at least 90 degrees to dispose another surface in the upper position; moving said nozzle through an arc about an axis parallel to the transverse axis of said body and the transverse axis of said gas stream for applying said gas stream at an acute angle against and along said other surface; and relatively moving said gas stream along said other surface in a reverse direction to condition said other surface.

6. A method for conditioning the surface of an elongated ferrous metal body, which comprises applying a gas stream from a nozzle at an acute angle against and along a bottom surface of said body; relatively moving said gas stream along said surface in a forward direction to condition said bottom surface; turning said body through an arc of at least 90 degrees to dispose another surface in the bottom position; moving said nozzle through an arc about an axis parallel to the transverse axis of said body and the transverse axis of said gas stream for applying said gas stream at an acute angle against and along said other surface; and relatively moving said gas stream along said other surface in a reverse direction to condition said other surface.

7. A method for conditioning surfaces of an elongated ferrous metal body, which comprises applying a gas stream from a nozzle at an acute angle against and along a lateral surface of said body; relatively moving said gas stream along said lateral surface in a forward direction to condition said surface; moving said nozzle through an arc about an axis parallel to the transverse axis of said body and parallel to said surface to apply said gas stream at an acute angle against and along an opposite surface, the axis of said arc being disposed substantially within the limits of the said oppositely-disposed surfaces of said body; and relatively moving said gas stream along said opposite surface to condition said opposite surface.

8. In a machine for thermochemically removing surface metal from the surfaces of ferrous metal bodies, the combination of a blowpipe head for applying a stream of oxygen obliquely against a surface of such a body, said oxygen stream being substantially equal in width to the width of said surface; pivotal means for supporting said blowpipe head in an operative position adjacent said surface whereby said head is movable through an arc about an axis parallel with said surface and whereby said head is movable to a different operative position adjacent a surface of said body; and means for moving said head and said body relatively to each other for advancing the desurfacing action along said surface, and for moving said head and said body relatively to each other in a direction opposite to the direction of said first-mentioned relative movement for advancing the desurfacing action along a surface in a direction opposite to the direction of advancement of said first-mentioned desurfacing action.

9. Apparatus as claimed in claim 8, including resilient means adapted to urge said head against said body when said head is in either of said positions, said resilient means being operative to hold said head in predetermined normal relation to said body.

10. In a machine for conditioning the surfaces of ferrous metal bodies, the combination of a blowpipe head for applying a gaseous stream against a first longitudinal surface of such a body; pivotal means for supporting said blowpipe head; and means for moving said head through an arc of approximately 180 degrees about an axis parallel to the transverse axis of said body and between said first surface and a second opposite longitudinal surface of said body whereby said head is movable from an operative position adjacent said first surface of such body to an operative position adjacent a second opposite longitudinal surface of said body.

11. Surface conditioning machine as claimed in claim 10, in which said moving means includes a gear-toothed member and a motor-driven pinion meshing therewith for moving said head through said arc.

12. In surface conditioning apparatus, the combination of blowpipe means for applying inclined jets against a first surface of a ferrous metal body; reversible propelling means for feeding said body relatively to said blowpipe means along a predetermined path in a direction generally opposite to the inclination of said jets, said blowpipe means being pivotally supported for movement about an axis parallel to said first surface, said axis being located in a plane extending transversely of said path for reversibly locating the angle of jet inclination for operation in opposite directions; and pivotal means, operable when said body has been propelled in one direction along said path, to alter the relative positions of said body and said blowpipe means so as to bring a second surface of said body into position to receive the reversed jets of said blowpipe means, said propelling means thereafter being operable to feed said body relative to said jets in a direction opposite to said first-mentioned feeding motion.

13. Surface conditioning apparatus as claimed in claim 12, wherein said pivotal means includes means for inverting said body relative to said propelling means.

14. Apparatus for thermochemically desurfacing metal bodies such as steel slabs, comprising in combination a blowpipe head for applying a gaseous desurfacing stream against a surface of such a slab and substantially in the direction of advancement of the desurfacing action; means for sequentially moving said slab in forward and rearward directions relatively to said head; means for pivotally supporting said head for movement through an arc about an axis parallel to the transverse axis of said slab; means for maintaining said head in the correct position adjacent a surface of said slab during the relative movement in one direction; and means for moving said head through an arc of substantially 180 degrees to a position adjacent an opposite surface during the relative movement in an opposite direction.

15. Apparatus as claimed in claim 14 which includes means for adjusting the level of the pivot axis of said pivotal supporting means relatively to said opposite surfaces.

16. In apparatus for surface conditioning a ferrous metal body, the combination of means for supporting such a body in position for conditioning; blowpipe means for applying a gaseous stream against a longitudinal surface of said body; means adapted to support said blowpipe means in an upper operative position above said body and in a lower operative position below said body; and means adapted for selectively moving said blowpipe means to said upper operative position above said body for conditioning an upper longitudinal surface of said body and for moving said blowpipe means to said lower operative position below said body for conditioning a lower longitudinal surface of said body.

17. A method for surface conditioning a ferrous metal body which comprises so positioning a gaseous stream discharge from a nozzle in an operative position adjacent such a body as to direct said stream at an acute angle against a longitudinal surface of said body and in the general direction in which the conditioning operation is to advance; relatively moving said nozzle and stream longitudinally along said surface in a direction to advance the conditioning operation along said surface in the general direction of flow of said gaseous stream; moving said nozzle through an arc about an axis parallel to said surface to position said nozzle in a second operative position adjacent said body so as to direct said stream at an acute angle against a longitudinal surface of said body; shutting off the flow of said gaseous stream while said nozzle is being moved from said first position to said second position; turning on the flow of said gaseous stream when said nozzle is in said second position; and, relatively moving said nozzle and gaseous stream longitudinally along said last-mentioned surface to advance the conditioning operation along said last-mentioned surface in the general direction of flow of said gaseous stream.

18. Apparatus for conditioning a ferrous metal body comprising, in combination, a blowpipe head adapted to direct a gaseous stream obliquely against a longitudinal surface of such a body in the general direction in which the conditioning operation is to advance; means pivotally supporting said blowpipe head; means for moving said head through an arc about an axis parallel to said surface whereby said head is moved from a first operative position adjacent a longitudinal surface of said body to a second operative position adjacent a longitudinal surface of said body; means for shutting off the flow of said gaseous stream while said head is being moved from said first position to said second position; and, means for moving said head and said body relatively to each other in a direction to advance the conditioning operation in the general direction of flow of said gaseous stream when said head is in said first operative position and when said head is in said second operative position.

HOMER W. JONES.